(12) United States Patent
Liu

(10) Patent No.: US 11,812,407 B2
(45) Date of Patent: Nov. 7, 2023

(54) METHOD AND APPARATUS FOR SENDING AND RECEIVING INFORMATION, BASE STATION AND USER EQUIPMENT

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 442 days.

(21) Appl. No.: 17/266,857

(22) PCT Filed: Aug. 10, 2018

(86) PCT No.: PCT/CN2018/100066
§ 371 (c)(1),
(2) Date: Feb. 8, 2021

(87) PCT Pub. No.: WO2020/029285
PCT Pub. Date: Feb. 13, 2020

(65) Prior Publication Data
US 2021/0297983 A1    Sep. 23, 2021

(51) Int. Cl.
*H04W 8/24* (2009.01)
*H04W 60/02* (2009.01)
(Continued)

(52) U.S. Cl.
CPC ..... *H04W 68/005* (2013.01); *H04W 52/0235* (2013.01)

(58) Field of Classification Search
None
See application file for complete search history.

(56) References Cited

U.S. PATENT DOCUMENTS

| 8,204,517 B1 | 6/2012 | Rai et al. |
| 2014/0211678 A1 | 7/2014 | Jafarian et al. |

(Continued)

FOREIGN PATENT DOCUMENTS

| CN | 105101044 A | 11/2015 |
| CN | 106304336 A | 1/2017 |

(Continued)

OTHER PUBLICATIONS

Examination Report for Indian Application No. 202147009267, dated Jan. 25, 2022, 9 pages.
(Continued)

*Primary Examiner* — Gary Lafontant
(74) *Attorney, Agent, or Firm* — Finnegan, Henderson, Farabow, Garrett & Dunner, L.L.P

(57) ABSTRACT

The present disclosure relates to methods and apparatuses for sending information, methods and apparatuses for receiving information, base stations, user equipment and computer readable storage media. The method of sending information includes: receiving auxiliary information of UE reported by the UE; determining to enter a reduced paging transmission area state according to the auxiliary information and pre-stored capability information of the UE; reducing a paging transmission area according to the reduced paging transmission area state; sending a wake-up signal or a wake-up channel for the UE within the reduced paging transmission area, where the reduced paging transmission area is a sub-area of a tracking area; and sending a paging message for the UE within the reduced paging transmission area. In examples of the present disclosure, the paging message for the UE is sent within the reduced paging transmission area, which effectively reduces signaling overhead.

18 Claims, 10 Drawing Sheets

(51) Int. Cl.
*H04W 68/00* (2009.01)
*H04W 52/02* (2009.01)

(56) References Cited

U.S. PATENT DOCUMENTS

| | | | |
|---|---|---|---|
| 2016/0192323 A1* | 6/2016 | Kim | H04W 52/0216 |
| | | | 455/458 |
| 2016/0205659 A1 | 7/2016 | Bergman et al. | |
| 2016/0338006 A1 | 11/2016 | Lee et al. | |
| 2017/0064670 A1 | 3/2017 | Shen et al. | |
| 2018/0084526 A1 | 3/2018 | Zhang et al. | |

FOREIGN PATENT DOCUMENTS

| | | | | |
|---|---|---|---|---|
| CN | 107113772 A | 8/2017 | | |
| CN | 107920388 A | 4/2018 | | |
| WO | WO-2018056347 A1 * | 3/2018 | | H04W 48/18 |
| WO | WO 2018/076266 A1 | 5/2018 | | |

OTHER PUBLICATIONS

European Patent Office, Office Action issued in Application No. 18929302.0, dated Aug. 29, 2022, 6 pages.

State Intellectual Property Office of the People's Republic of China, Office Action and Search Report Issued in Application No. 2018800017653, dated Apr. 17, 2020, 13 pages.

ISA State Intellectual Property Office of the People's Republic of China, International Search Report Issued in Application No. PCT/CN2018/100066, dated May 9, 2019, WIPO, 4 pages.

State Intellectual Property Office of the People's Republic of China, Office Action and Search Report Issued in Application No. 201880001765.3, dated Dec. 15, 2020, 10 pages.

ISA State Intellectual Property Office of the People's Republic of China, Written Opinion of the International Searching Authority Issued in Application No. PCT/CN2018/100066, dated May 9, 2019, WIPO, 9 pages.

European Patent Office, Extended European Search Report issued in Application No. 18929302.0, dated Jul. 19, 2021, 9 pages.

* cited by examiner

METHOD AND APPARATUS FOR SENDING AND RECEIVING INFORMATION, BASE STATION AND USER EQUIPMENT

CROSS REFERENCE TO RELATED APPLICATIONS

This application is a national phase application based on International Application No. PCT/CN2018/100066, filed Aug. 10, 2018, the content of which is incorporated herein by reference.

TECHNICAL FIELD

The present disclosure relates to the field of communication technology, and in particular, to a method and apparatus for sending information, a method and apparatus for receiving information, a base station, user equipment and computer readable storage media.

BACKGROUND

In $3^{rd}$ Generation Partnership Project (3GPP) user equipment (UE) power reduction study, the introduction of UE reporting auxiliary information and a network providing auxiliary information may be considered to reduce UE power consumption. In addition, the introduction of a wake-up signal is a very important feature. In idle and inactive states, the wake-up signal may be used to reduce the power consumption of the UE to receive paging. In a connected state, the wake-up signal or a wake-up channel may reduce the power consumption of the UE by indicating information related to analyzing a physical downlink control channel (PDCCH).

A present paging area is generally a tracking area. Both the wake-up signal and a paging message are sent in this area. Measurement configuration needs to consider a plurality of cells. Such consideration is mainly to meet the demand for high mobility in a communication network, and is also the biggest advantage of Public Land Mobile Network (PLMN). However, such an advantage is accompanied by a rise in UE power consumption and an increase in signaling overhead.

SUMMARY

In view of this, the present application discloses methods and apparatuses for sending information, methods and apparatuses for receiving information, base stations, user equipment and computer readable storage media, to lower UE power consumption and reduce signaling overhead.

According to a first aspect of examples of the present disclosure, a method of sending information is provided. The method is applicable to a base station, and includes:
  receiving auxiliary information of user equipment (UE) reported by the UE;
  determining to enter a reduced paging transmission area state according to the auxiliary information and pre-stored capability information of the UE;
  reducing a paging transmission area according to the reduced paging transmission area state, and sending a wake-up signal or a wake-up channel for the UE within the reduced paging transmission area, where the reduced paging transmission area is a sub-area of a tracking area; and
  sending a paging message for the UE within the reduced paging transmission area.

In an example, the method further includes:
  before determining to enter the reduced paging transmission area state according to the auxiliary information and the pre-stored capability information of the UE, determining that the paging message for the UE does not belong to a preset type of paging message.

In an example, the method further includes:
  setting a first paging count threshold and a second paging count threshold; and
  if a number of times sending the paging message within the reduced paging transmission area reaches the first paging count threshold and the UE has not been paged, restoring the paging transmission area to an initial paging transmission area, and sending the paging message within the initial paging transmission area.

In an example, the method further includes:
  if a number of times sending the paging message within the initial paging transmission area reaches the second paging count threshold and the UE has not been paged, aborting sending the paging message.

In an example, the method further includes:
  not re-entering the reduced paging transmission area state for a second preset time period from restoring the paging transmission area to the initial paging transmission area.

In an example, the method further includes:
  receiving and storing capability information updated and reported by the UE;
  sending the wake-up signal or the wake-up channel for the UE within an initial paging transmission area according to the present capability information of the UE; and
  sending the paging message for the UE within the initial paging transmission area.

In an example, receiving the auxiliary information of the UE reported by the UE includes:
  receiving the auxiliary information of the UE reported by the UE through a preset request.

According to a second aspect of the examples of the present disclosure, a method of receiving information is provided. The method is applicable to user equipment (UE), and includes:
  if no cell reselection occurs within a first preset time period, reporting auxiliary information of the UE to a base station; and
  receiving a paging message for the UE sent from the base station according to the auxiliary information.

In an example, the method further includes:
  reporting capability information of the UE to the base station.

In an example, the method further includes:
  after reporting the capability information of the UE to the base station, updating and reporting capability information of the UE to the base station.

In an example, reporting the capability information of the UE to the base station includes:
  sending an RRC connection establishment request to the base station, where the RRC connection establishment request carries the capability information; or
  receiving a capability query request from the base station, and sending the capability information of the UE to the base station according to the capability query request.

In an example, reporting the auxiliary information of the UE to the base station includes:
  reporting the auxiliary information of the UE to the base station through a preset request.

According to a third aspect of the examples of the present disclosure, an apparatus for sending information is provided. The apparatus is applicable to a base station, and includes:

a receiving module configured to receive auxiliary information of user equipment (UE) reported by the UE;
a first determining module configured to determine to enter a reduced paging transmission area state according to the auxiliary information received by the receiving module and pre-stored capability information of the UE;
a first sending module configured to reduce a paging transmission area according to the reduced paging transmission area state determined to enter by the first determining module, and send a wake-up signal or a wake-up channel for the UE within the reduced paging transmission area, where the reduced paging transmission area is a sub-area of a tracking area; and
a second sending module configured to send a paging message for the UE within the reduced paging transmission area determined to enter by the determining module.

In an example, the apparatus further includes:
a second determining module configured to, before the first determining module determines to enter the reduced paging transmission area state according to the auxiliary information and the pre-stored capability information of the UE, determine that the paging message for the UE does not belong to a preset type of paging message.

In an example, the apparatus further includes:
a setting module configured to set a first paging count threshold and a second paging count threshold; and
a restoring and sending module configured to, if a number of times sending the paging message within the reduced paging transmission area reaches the first paging count threshold set by the setting module and the UE has not been paged, restore the paging transmission area to an initial paging transmission area, and send the paging message within the initial paging transmission area.

In an example, the apparatus further includes:
a sending aborting module configured to abort sending the paging message if a number of times sending the paging message within the initial paging transmission area restored by the restoring and sending module reaches the second paging count threshold set by the setting module and the UE has not been paged.

In an example, the apparatus further includes:
a processing module configured not to re-enter the reduced paging transmission area state for a second preset time period from the restoring and sending module restoring the paging transmission area to the initial paging transmission area.

In an example, the apparatus further includes:
a receiving and storing module configured to receive and store capability information updated and reported by the UE;
a third sending module configured to send the wake-up signal or the wake-up channel for the UE within an initial paging transmission area according to the present capability information of the UE stored by the receiving and storing module; and
a fourth sending module configured to, after the third sending module sends the wake-up signal or the wake-up channel for the UE, send the paging message for the UE within the initial paging transmission area.

In an example, the receiving module is configured to:
receive the auxiliary information of the UE reported by the UE through a preset request.

According to a fourth aspect of the examples of the present disclosure, an apparatus for receiving information is provided. The apparatus is applicable to user equipment (UE), and includes:

a first reporting module configured to, if no cell reselection occurs within a first preset time period, report auxiliary information of the UE to a base station; and
a receiving module configured to receive a paging message for the UE sent from the base station according to the auxiliary information reported by the first reporting module.

In an example, the apparatus further includes:
a second reporting module configured to report capability information of the UE to the base station.

In an example, the apparatus further includes:
an updating and reporting module configured to, after the second reporting module reports the capability information of the UE to the base station, update and report capability information of the UE to the base station.

In an example, the second reporting module includes:
a sending submodule configured to send an RRC connection establishment request to the base station, where the RRC connection establishment request carries the capability information; or
a receiving and sending submodule configured to receive a capability query request from the base station, and send the capability information of the UE to the base station according to the capability query request.

In an example, the first reporting module is configured to:
report the auxiliary information of the UE to the base station through a preset request.

According to a fifth aspect of the examples of the present disclosure, a base station is provided. The base station includes:

a processor, and
a memory for storing instructions executable by the processor,
where the processor is configured to:
receive auxiliary information of user equipment (UE) reported by the UE;
determine to enter a reduced paging transmission area state according to the auxiliary information and pre-stored capability information of the UE;
reduce a paging transmission area according to the reduced paging transmission area state, and send a wake-up signal or a wake-up channel for the UE within the reduced paging transmission area, where the reduced paging transmission area is a sub-area of a tracking area; and
send a paging message for the UE within the reduced paging transmission area.

According to a sixth aspect of the examples of the present disclosure, user equipment is provided. The UE includes:
a processor, and
a memory for storing instructions executable by the processor,
where the processor is configured to:
if no cell reselection occurs within a first preset time period, report auxiliary information of the UE to a base station; and
receive a paging message for the UE sent from the base station according to the auxiliary information.

According to a seventh aspect of the examples of the present disclosure, a computer readable storage medium storing computer instructions is provided. The instructions are executed by a processor to perform the steps in the method of sending information as described above.

According to an eighth aspect of the examples of the present disclosure, a computer readable storage medium storing computer instructions is provided. The instructions are executed by a processor to perform the steps in the method of receiving information as described above.

The technical solutions provided by the examples of the present disclosure may include the following beneficial effects.

To enter the reduced paging transmission area state is determined according to the received auxiliary information of the UE and the pre-stored capability information of the UE. The paging transmission area is reduced according to the reduced paging transmission area state, the wake-up signal or the wake-up channel for the UE is sent within the reduced paging transmission area, and then the paging message for the UE is sent within the reduced paging transmission area. In the example, since the paging message for the UE is sent within the reduced paging transmission area, the signaling overhead can be effectively reduced.

When no cell reselection occurs within the first preset time period, the auxiliary information of the UE is reported to the base station, and the paging message for the UE is received from the base station according to the auxiliary information. Since the UE receives the paging message for the UE within the reduced paging transmission area, the power consumption of the UE may be reduced.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
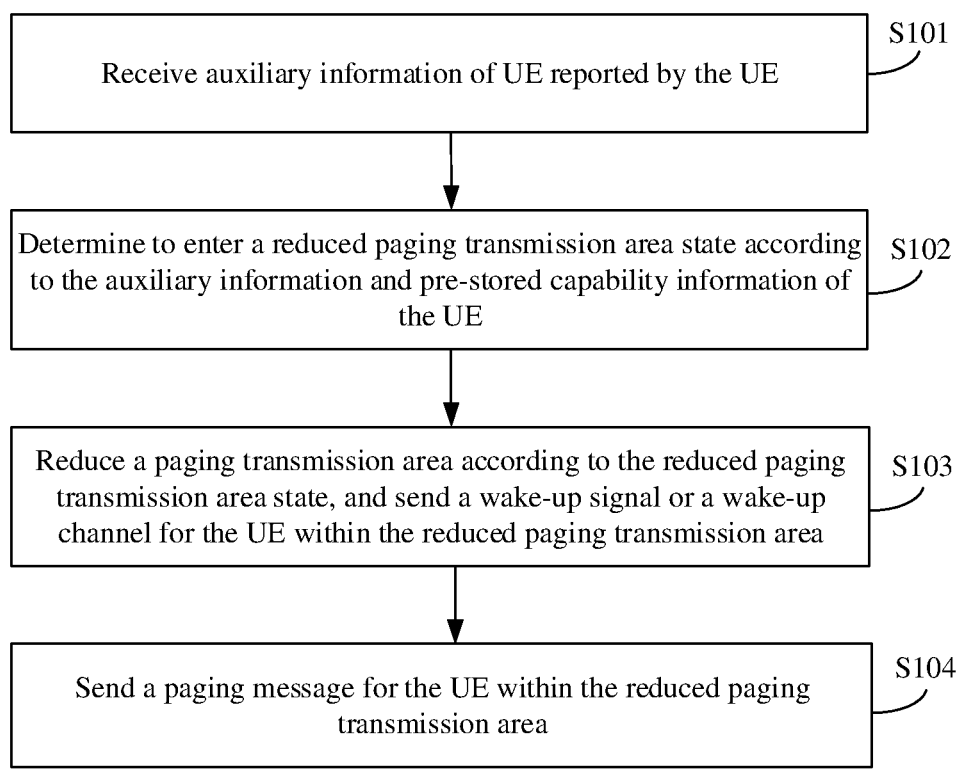
FIG. 1 is a flowchart illustrating a method of sending information according to an example of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method of sending information according to an example of the present application. The example is described from a base station side. As shown in FIG. 1, the method of sending information includes the following.

At step S101, auxiliary information of UE reported by the UE is received.

If the UE does not perform cell reselection within a first preset time period, the UE can report the auxiliary information of the UE to a base station. For example, the auxiliary information of the UE may be reported to the base station through a preset request. That is, the base station may receive the auxiliary information of the UE reported by the UE through the preset request.

At step S102, to enter a reduced paging transmission area state is determined according to the auxiliary information and pre-stored capability information of the UE.

Optionally, before step S102, the method may further include: receiving and storing the capability information of the UE reported by the UE, such that the state of entering the reduced paging transmission area is determined according to the auxiliary information and the capability information of the UE.

The capability information of the UE may include low mobile capability information of the UE.

In addition, optionally, before the step S102, the method may further include: determining that a paging message for the UE does not belong to a preset type of paging message. That is, a paging area may not be narrowed down for a paging message belonging to the preset type. The preset type of paging message may include a paging message relating to system information modification and a paging message relating to cell information.

At step S103, a paging transmission area is reduced according to the reduced paging transmission area state, and a wake-up signal or a wake-up channel for the UE is sent within the reduced paging transmission area. The reduced paging transmission area is a sub-area of a tracking area.

The tracking area refers to an area corresponding to an initial paging transmission area.

At step S104, a paging message for the UE is sent within the reduced paging transmission area.

In the example, the base station firstly sends the wake-up signal or channel for the UE within the reduced paging transmission area, and then sends the paging message for the UE within the reduced paging transmission area, which reduces signaling overhead.

In addition, optionally, the method may further include: receiving and storing capability information updated and reported by the UE; sending the wake-up signal or the wake-up channel for the UE within an initial paging transmission area according to present capability information of the UE; and sending the paging message for the UE within the initial paging transmission area. For example, after capability of the UE is changed from a low mobile capability to a high mobile capability, the wake-up signal or channel for the UE may be sent within the initial paging transmission area, and then the paging message for the UE may be sent within the initial paging transmission area, which ensures paging performance.

In the example, to enter the reduced paging transmission area state is determined according to the received auxiliary information of the UE and the pre-stored capability information of the UE. The paging transmission area is reduced according to the reduced paging transmission area state, the wake-up signal or the wake-up channel for the UE is sent within the reduced paging transmission area, and then the paging message for the UE is sent within the reduced paging transmission area. In the example, since the paging message for the UE is sent within the reduced paging transmission area, the signaling overhead can be effectively reduced.

Figure 2:
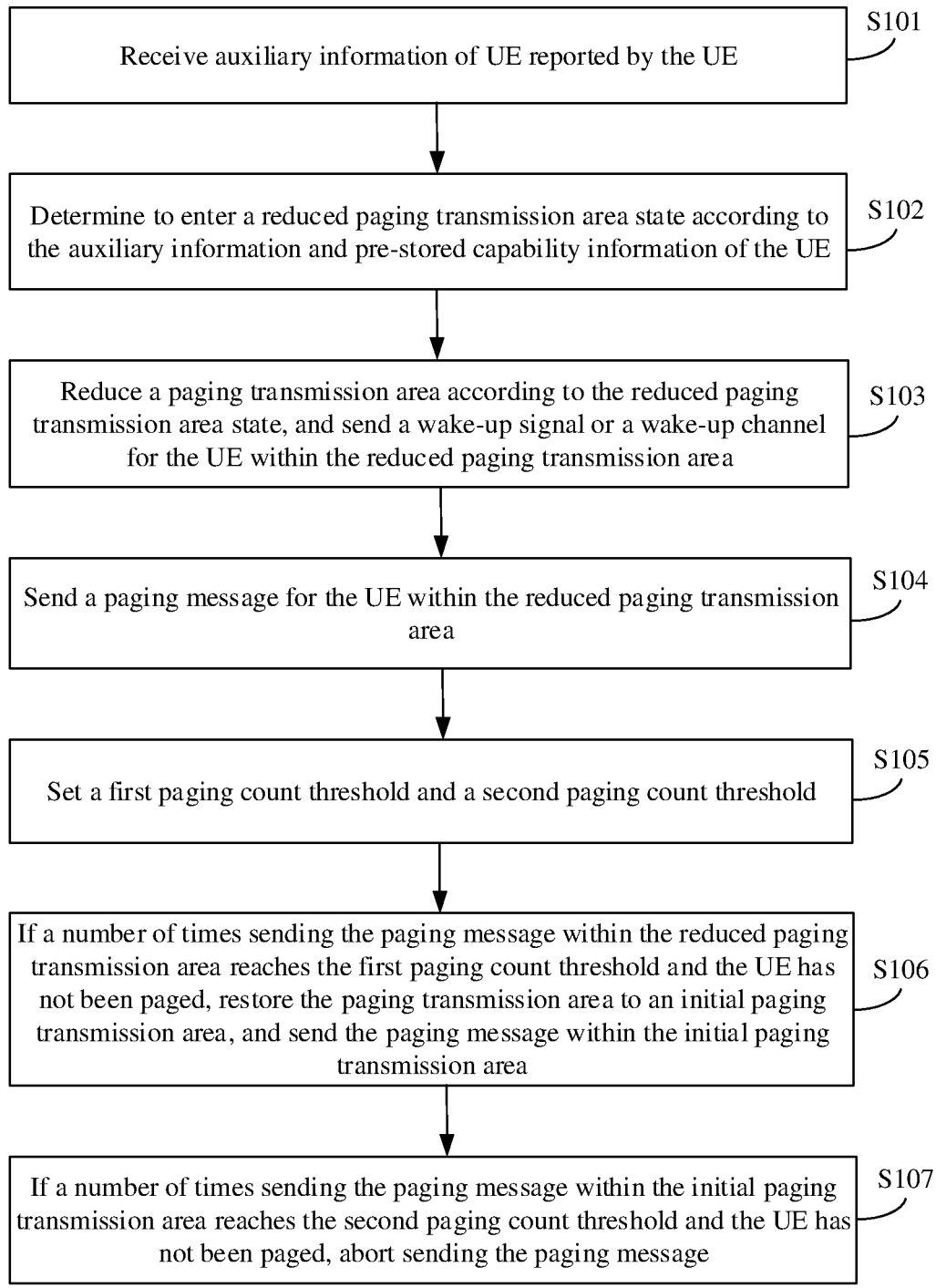
FIG. 2 is a flowchart illustrating another method of sending information according to an example of the present application.

FIG. 2 is a flowchart illustrating another method of sending information according to an example of the present application. As shown in FIG. 2, after step S104, the method may further include the following.

At step S105, a first paging count threshold and a second paging count threshold are set.

Both the first paging count threshold and the second paging count threshold are less than an initial paging count.

At step S106, if a number of times sending the paging message within the reduced paging transmission area reaches the first paging count threshold and the UE has not been paged, the paging transmission area is restored to an initial paging transmission area, and the paging message is sent within the initial paging transmission area.

To save the signaling overhead, the paging message may be sent firstly within the reduced paging transmission area, and if the number of times sending the paging message within the reduced paging transmission area reaches the first paging count threshold and the UE is still not paged, the paging transmission area is restored to the initial paging transmission area, and the paging message is sent within the initial paging transmission area, which ensures paging performance. If the UE is paged, sending the paging message is stopped.

Optionally, the method may further include: the base station cannot re-enter the reduced paging transmission area state for a second preset time period from restoring the paging transmission area to the initial paging transmission area, thus, power consumption due to frequent state switching may be reduced.

At step S107, if a number of times sending the paging message within the initial paging transmission area reaches the second paging count threshold and the UE has not been paged, sending the paging message is aborted.

Optionally, if the number of times sending the paging message within the initial paging transmission area reaches the second paging count threshold and the UE is still not paged, sending the paging message is aborted to save system power consumption. If the UE is paged, sending the paging message is stopped.

In the example, the first paging count threshold and the second paging count threshold are set; and if the number of times sending the paging message within the reduced paging transmission area reaches the first paging count threshold and the UE has not been paged, the paging transmission area is restored to the initial paging transmission area, and the paging message is sent within the initial paging transmission area, which ensures paging performance.

Figure 3:
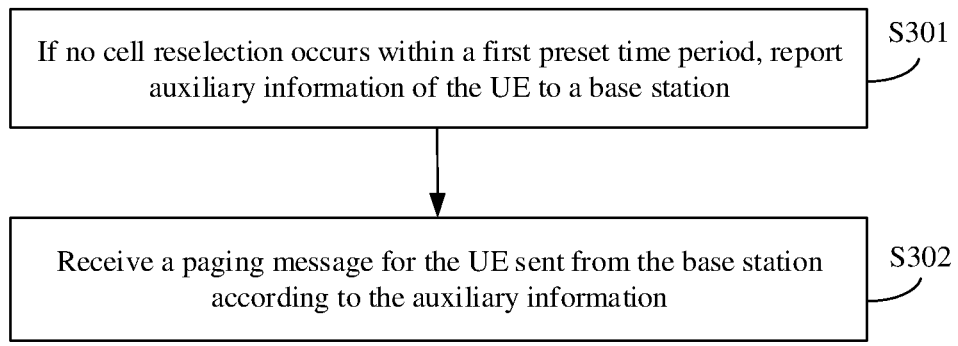
FIG. 3 is a flowchart illustrating a method of receiving information according to an example of the present application.

FIG. 3 is a flowchart illustrating a method of receiving information according to an example of the present application. The example is described from a UE side. As shown in FIG. 3, the method of receiving information includes the following.

At step S301, if no cell reselection occurs within a first preset time period, auxiliary information of UE is reported to a base station.

If the UE does not perform the cell reselection within the first preset time period, the auxiliary information of the UE may be reported to the base station. For example, the auxiliary information of the UE may be reported to the base station through a preset request.

The first preset time period may be set flexibly as required. The preset request may be, but is not limited to, a request to reduce a paging area.

Optionally, the method may further include: reporting capability information of the UE to the base station.

In addition, optionally, after the capability information of the UE is reported to the base station, the capability information of the UE may also be updated, and the updated capability information of the UE may be reported to the base station.

The capability information of the UE may be reported to the base station in various ways. For example, a radio resource control (RRC) connection establishment request may be sent to the base station, where the RRC connection establishment request carries the capability information, or a capability query request may be received from the base station, and the capability information of the UE may be sent to the base station according to the capability query request.

At step S302, a paging message for the UE sent from the base station according to the auxiliary information is received.

After receiving the auxiliary information of the UE reported by the UE, the base station can enter a reduced paging transmission area state according to the auxiliary information and the capability information, narrow the paging transmission area based on the reduced paging transmission area state. The base station can firstly send a wake-up signal or a wake-up channel for the UE within the reduced paging transmission area, then send the paging message for the UE within the reduced paging transmission area, in this way, the UE receives the paging message for the UE within the reduced paging transmission area, which reduces the power consumption of the UE.

In the example, when no cell reselection occurs within the first preset time period, the auxiliary information of the UE is reported to the base station, and the paging message for the UE is received from the base station according to the auxiliary information. Since the UE receives the paging message for the UE within the reduced paging transmission area, the power consumption of the UE may be reduced.

Figure 4:
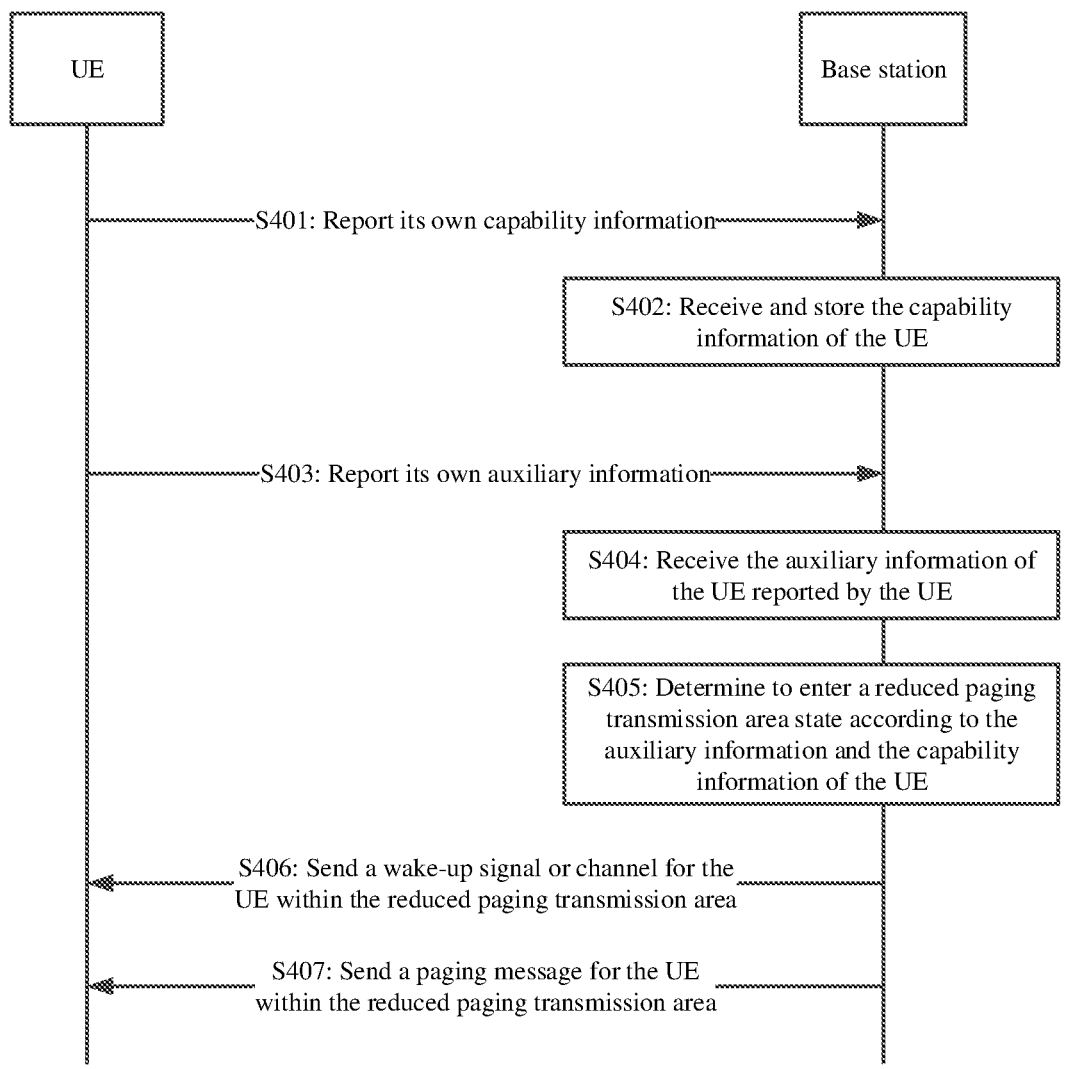
FIG. 4 is a signaling flowchart illustrating a method of receiving information according to an example of the present application.

FIG. 4 is a signaling flowchart illustrating a method of receiving information according to an example of the present application. The example is described from the perspective of the base station and UE interaction. As shown in FIG. 4, the method includes the following.

At step S401, UE reports its own capability information to a base station.

At step S402, the base station receives and stores the capability information of the UE.

At step S403, if the UE does not perform cell reselection within a first preset time period, the UE reports auxiliary information of the UE is reported to the base station.

At step S404, the base station receives the auxiliary information of the UE reported by the UE.

At step S405, the base station determines to enter a reduced paging transmission area state according to the auxiliary information and the capability information of the UE.

At step S406, the base station reduces a paging transmission area according to the reduced paging transmission area state, and sends a wake-up signal or a wake-up channel for the UE within the reduced paging transmission area. The reduced paging transmission area is a sub-area of a tracking area.

At step S407, the base station sends a paging message for the UE within the reduced paging transmission area.

In the example, through the interaction between the base station and the UE, the base station can send the paging message for the UE within the reduced paging transmission area, which effectively reduces signaling overhead, and the UE can receive the paging message for the UE within the reduced paging transmission area, which decreases power consumption of the UE.

Figure 5:
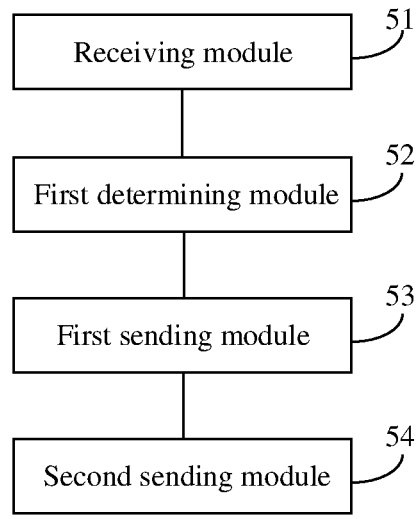
FIG. 5 is a block diagram illustrating an apparatus for sending information according to an example.

FIG. 5 is a block diagram illustrating an apparatus for sending information according to an example. The apparatus may be located in a base station. As shown in FIG. 5, the apparatus includes the following.

A receiving module 51 is configured to receive auxiliary information of UE reported by the UE.

If the UE does not perform cell reselection within a first preset time period, the UE can report the auxiliary information of the UE to the base station. For example, the auxiliary information of the UE may be reported to the base station through a preset request. That is, the base station may receive the auxiliary information of the UE reported by the UE through the preset request.

A first determining module 52 is configured to determine to enter a reduced paging transmission area state according to the auxiliary information received by the receiving module 51 and pre-stored capability information of the UE.

A first sending module 53 is configured to reduce a paging transmission area according to the reduced paging transmission area state determined to enter by the first determining module 52, and send a wake-up signal or a wake-up channel for the UE within the reduced paging transmission area, where the reduced paging transmission area is a sub-area of a tracking area.

The tracking area refers to an area corresponding to an initial paging transmission area.

A second sending module 54 is configured to send a paging message for the UE within the reduced paging transmission area determined to enter by the first determining module 52.

In the example, the base station firstly sends the wake-up signal or channel for the UE within the reduced paging transmission area, and then sends the paging message for the UE within the reduced paging transmission area, which reduces signaling overhead.

In the example, to enter the reduced paging transmission area state is determined according to the received auxiliary information of the UE and the pre-stored capability information of the UE. The paging transmission area is reduced according to the reduced paging transmission area state, the wake-up signal or the wake-up channel for the UE is sent within the reduced paging transmission area, and then the paging message for the UE is sent within the reduced paging transmission area. In the example, since the paging message for the UE is sent within the reduced paging transmission area, the signaling overhead can be effectively reduced.

Figure 6:
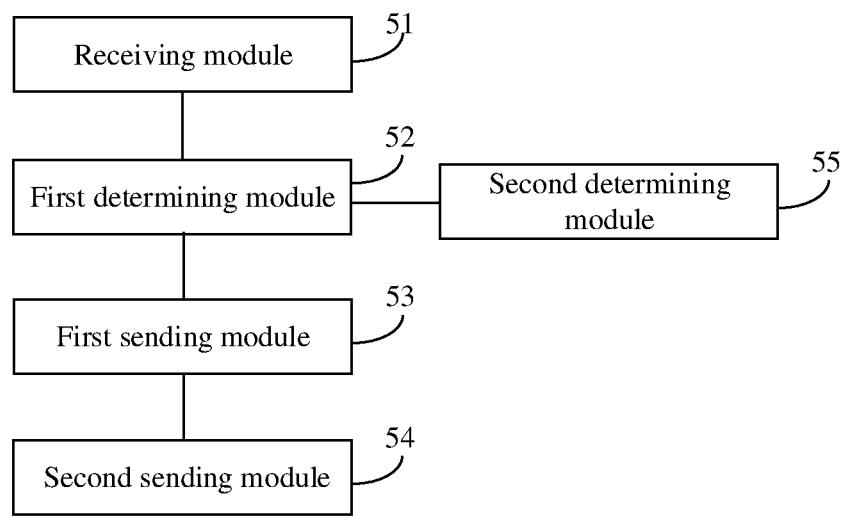
FIG. 6 is a block diagram illustrating another apparatus for sending information according to an example.

FIG. 6 is a block diagram illustrating another apparatus for sending information according to an example. As shown in FIG. 6, based on the example shown in FIG. 5, the apparatus may further include the following.

A second determining module 55 is configured to, before the first determining module 52 determines to enter the reduced paging transmission area state according to the auxiliary information and the pre-stored capability information of the UE, determine that the paging message for the UE does not belong to a preset type of paging message.

The preset type of paging message may include a paging message relating to system information modification and a paging message relating to cell information.

In the example, before determining to enter the reduced paging transmission area state according to the auxiliary information and the pre-stored capability information of the UE, it is determined that the paging message for the UE does not belong to the preset type of paging message, which ensures paging performance.

Figure 7:
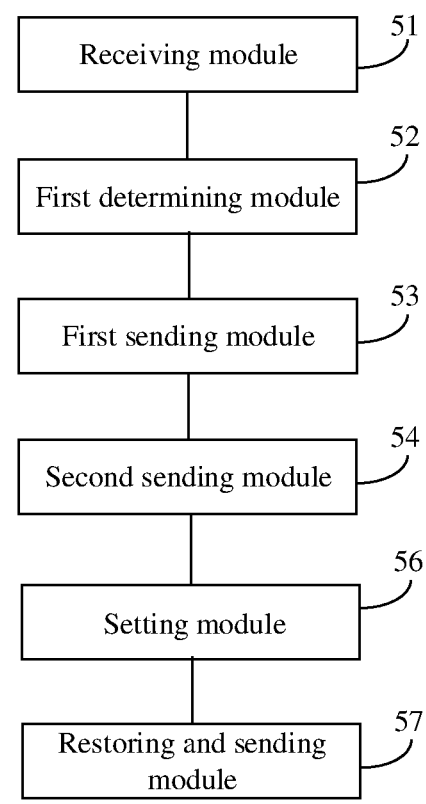
FIG. 7 is a block diagram illustrating another apparatus for sending information according to an example.

FIG. 7 is a block diagram illustrating another apparatus for sending information according to an example. As shown in FIG. 7, based on the example shown in FIG. 5, the apparatus may further include the following.

A setting module 56 is configured to set a first paging count threshold and a second paging count threshold.

Both the first paging count threshold and the second paging count threshold are less than an initial paging count.

A restoring and sending module 57 is configured to, if a number of times sending the paging message within the reduced paging transmission area reaches the first paging count threshold set by the setting module 56 and the UE has not been paged, restore the paging transmission area to an initial paging transmission area, and send the paging message within the initial paging transmission area.

To save the signaling overhead, the paging message may be sent firstly within the reduced paging transmission area, and if the number of times sending the paging message within the reduced paging transmission area reaches the first paging count threshold and the UE is still not paged, the paging transmission area is restored to the initial paging transmission area, and the paging message is sent within the initial paging transmission area, which ensures paging performance. If the UE is paged, sending the paging message is stopped.

In the example, the first paging count threshold and the second paging count threshold are set; and if the number of times sending the paging message within the reduced paging transmission area reaches the first paging count threshold and the UE has not been paged, the paging transmission area is restored to the initial paging transmission area, and the paging message is sent within the initial paging transmission area, which ensures paging performance.

Figure 8:
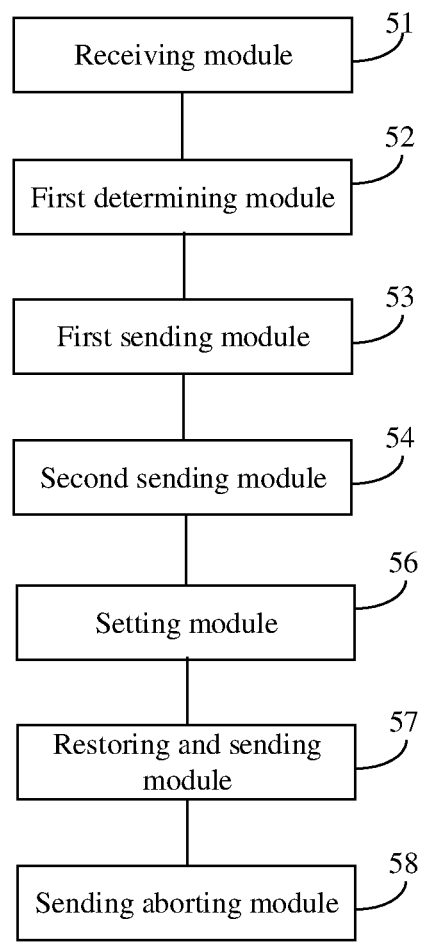
FIG. 8 is a block diagram illustrating another apparatus for sending information according to an example.

FIG. 8 is a block diagram illustrating another apparatus for sending information according to an example. As shown in FIG. 8, based on the example shown in FIG. 7, the apparatus may further include the following.

A sending aborting module 58 is configured to abort sending the paging message if a number of times sending the paging message within the initial paging transmission area restored by the restoring and sending module 57 reaches the second paging count threshold set by the setting module 56 and the UE has not been paged.

In the example, when the number of times sending the paging message within the initial paging transmission area reaches the second paging count threshold and the UE is still not paged, sending the paging message is aborted to save system power consumption.

Figure 9:
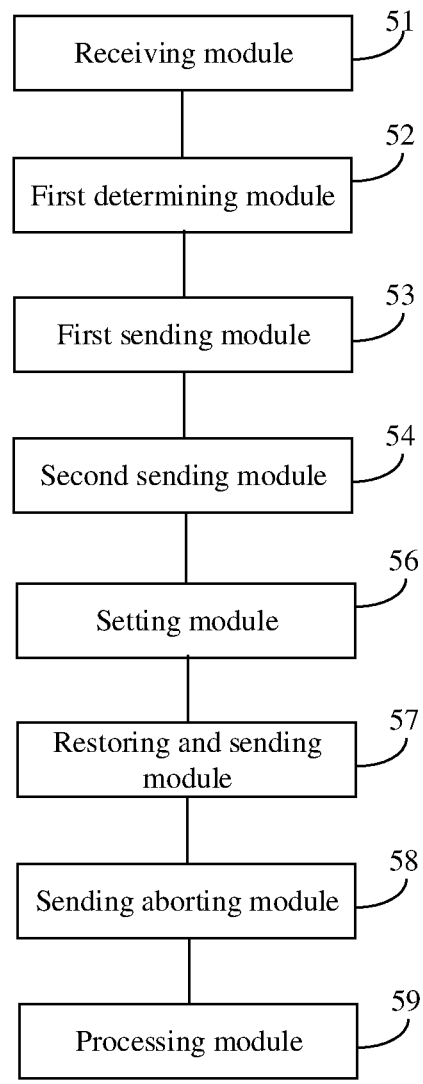
FIG. 9 is a block diagram illustrating another apparatus for sending information according to an example.

FIG. 9 is a block diagram illustrating another apparatus for sending information according to an example. As shown in FIG. 9, based on the example shown in FIG. 7, the apparatus may further include the following.

A processing module 59 is configured not to re-enter the reduced paging transmission area state for a second preset time period from the restoring and sending module 57 restoring the paging transmission area to the initial paging transmission area.

In the example, the reduced paging transmission area state cannot be re-entered for the second preset time period from restoring the paging transmission area to the initial paging transmission area, thus, power consumption due to frequent state switching may be reduced.

Figure 10:
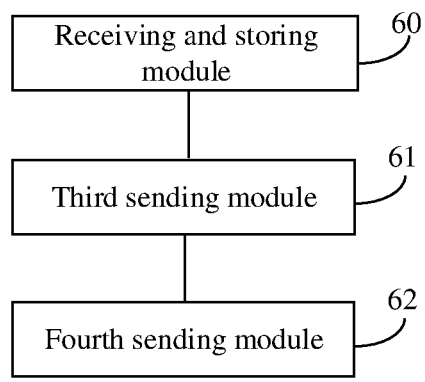
FIG. 10 is a block diagram illustrating another apparatus for sending information according to an example.

FIG. 10 is a block diagram illustrating another apparatus for sending information according to an example. As shown in FIG. 10, based on the example shown in FIG. 5, the apparatus may further include the following.

A receiving and storing module 60 is configured to receive and store capability information updated and reported by the UE.

A third sending module 61 is configured to send the wake-up signal or the wake-up channel for the UE within an initial paging transmission area according to the present capability information of the UE stored by the receiving and storing module 60.

The fourth sending module 62 is configured to, after the third sending module 61 sends the wake-up signal or the wake-up channel for the UE, send the paging message for the UE within the initial paging transmission area.

For example, after capability of the UE is changed from a low mobile capability to a high mobile capability, the wake-up signal or channel for the UE may be sent within the initial paging transmission area, and then the paging message for the UE may be sent within the initial paging transmission area, which ensures paging performance.

In the example, the wake-up signal or channel for the UE is sent within the initial paging transmission area according to the present capability information of the UE stored by the receiving and storing module, and then the paging message for the UE is sent within the initial paging transmission area, which ensures paging performance.

Figure 11:
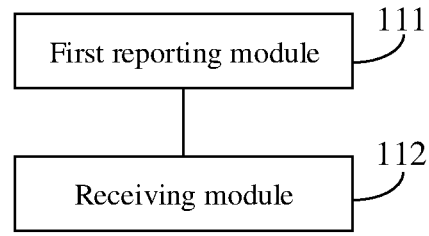
FIG. 11 is a block diagram illustrating an apparatus for receiving information according to an example.

FIG. 11 is a block diagram illustrating an apparatus for receiving information according to an example. The apparatus may be located in UE. As shown in FIG. 11, the apparatus includes the following.

A first reporting module 111 is configured to, if no cell reselection occurs within a first preset time period, report auxiliary information of the UE to a base station.

If the UE does not perform the cell reselection within the first preset time period, the auxiliary information of the UE may be reported to the base station. For example, the auxiliary information of the UE may be reported to the base station through a preset request.

The first preset time period may be set flexibly as required. The preset request may be, but is not limited to, a request to reduce a paging area.

The receiving module 112 is configured to receive a paging message for the UE sent from the base station according to the auxiliary information reported by the first reporting module 111.

After receiving the auxiliary information of the UE reported by the UE, the base station can enter a reduced paging transmission area state according to the auxiliary information and capability information, narrow a paging transmission area based on the reduced paging transmission area state. The base station can firstly send a wake-up signal or a wake-up channel for the UE within the reduced paging transmission area, then send the paging message for the UE within the reduced paging transmission area, in this way, the UE receives the paging message for the UE within the reduced paging transmission area, which reduces the power consumption of the UE.

In the example, when no cell reselection occurs within the first preset time period, the auxiliary information of the UE is reported to the base station, and the paging message for the UE is received from the base station according to the auxiliary information. Since the UE receives the paging message for the UE within the reduced paging transmission area, the power consumption of the UE may be reduced.

Figure 12:
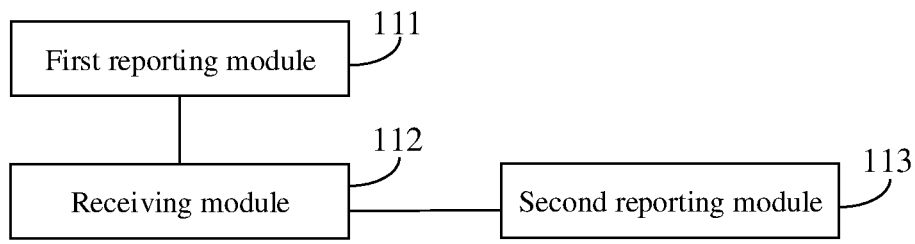
FIG. 12 is a block diagram illustrating another apparatus for receiving information according to an example.

FIG. 12 is a block diagram illustrating another apparatus for receiving information according to an example. As shown in FIG. 12, based on the example shown in FIG. 11, the apparatus may further include the following.

A second reporting module 113 is configured to report capability information of the UE to the base station.

In the example, the UE reports its own capability information to the base station, such that the base station can determine whether to enter the reduced paging transmission area state according to the capability information of the UE and the reported auxiliary information.

Figure 13:
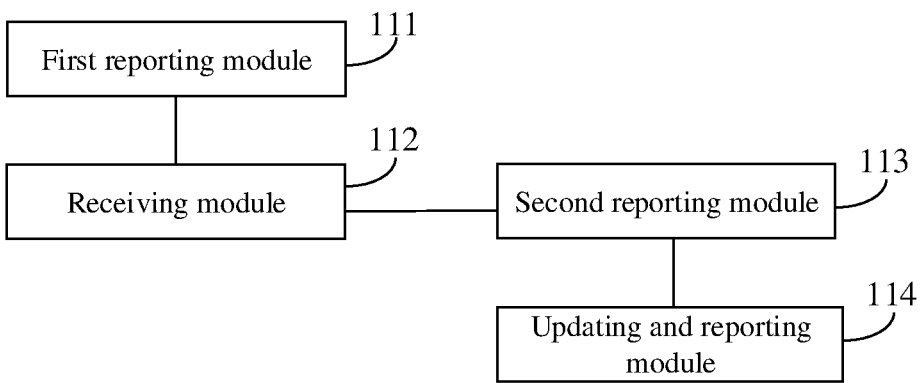
FIG. 13 is a block diagram illustrating another apparatus for receiving information according to an example.

FIG. 13 is a block diagram illustrating another apparatus for receiving information according to an example. As shown in FIG. 13, based on the example shown in FIG. 12, the apparatus may further include the following.

An updating and reporting module 114 is configured to, after the second reporting module 113 reports the capability information of the UE to the base station, update and report capability information of the UE to the base station.

In the example, the UE updates and reports its own capability information to the base station, such that the base station can determine whether to enter the reduced paging transmission area state according to the present capability information of the UE and the reported auxiliary information.

Figure 14:
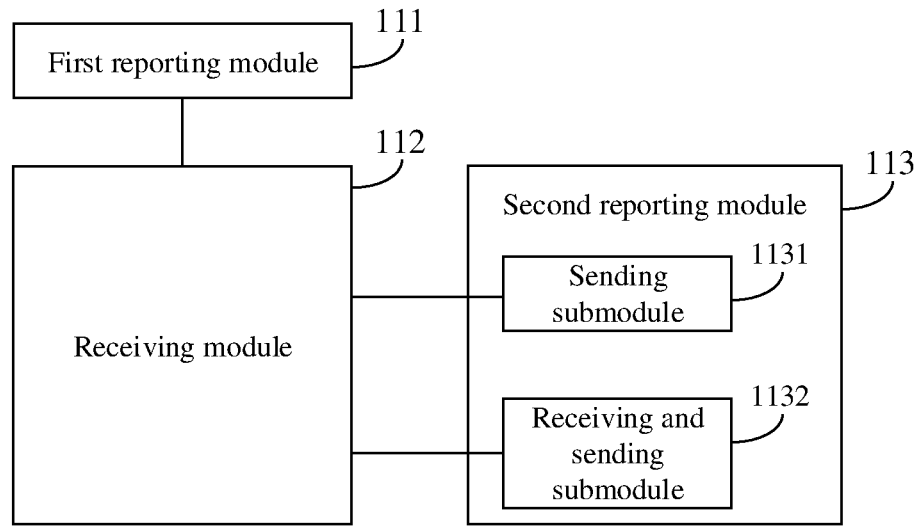
FIG. 14 is a block diagram illustrating another apparatus for receiving information according to an example.

FIG. 14 is a block diagram illustrating another apparatus for receiving information according to an example. As shown in FIG. 14, based on the example shown in FIG. 12, the second reporting module 113 may include: a sending submodule 1131, or a receiving and sending submodule 1132.

The sending submodule 1131 is configured to send an RRC connection establishment request to the base station, where the RRC connection establishment request carries the capability information.

The receiving and sending submodule 1132 is configured to receive a capability query request from the base station, and send the capability information of the UE to the base station according to the capability query request.

In the example, the UE may report its own capability information to the base station in various ways, which are flexible and diverse.

Figure 15:
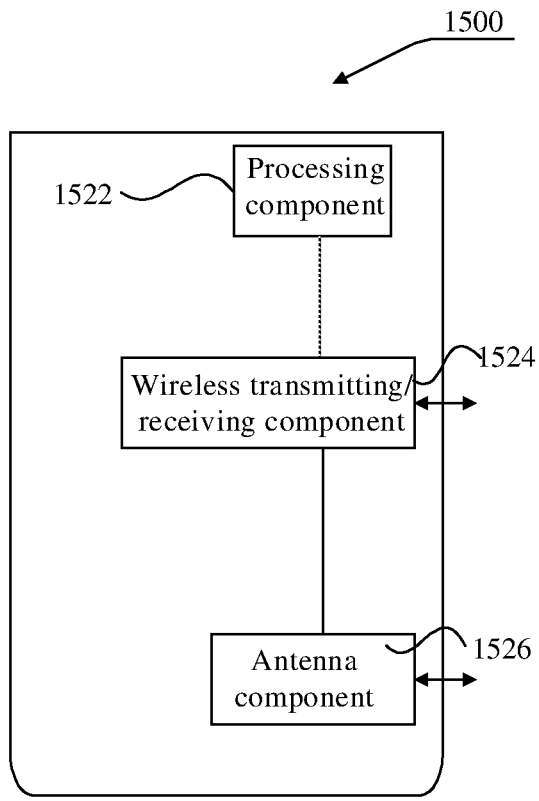
FIG. 15 is a block diagram illustrating an apparatus suitable for sending information according to an example.

FIG. 15 is a block diagram illustrating an apparatus suitable for sending information according to an example.

An apparatus 1500 may be provided to a base station. Referring to FIG. 15, the apparatus 1500 includes a processing component 1522, a wireless transmitting/receiving component 1524, an antenna component 1526, and a signal processing portion specific to a wireless interface. The processing component 1522 may further include one or more processors.

One of the processors in the processing component 1522 may be configured to:
- receive auxiliary information of UE reported by the UE;
- determine to enter a reduced paging transmission area state according to the auxiliary information and pre-stored capability information of the UE;
- reduce a paging transmission area according to the reduced paging transmission area state, and send a wake-up signal or a wake-up channel for the UE within the reduced paging transmission area, where the reduced paging transmission area is a sub-area of a tracking area; and
- send a paging message for the UE within the reduced paging transmission area.

In an example, there is also provided a non-transitory computer readable storage medium including instructions. The instructions are executable by the processing component 1522 of the apparatus 1500 to perform the method of sending information as described above. For example, the non-transitory computer readable storage medium may be a read only memory ROM, a random access memory (RAM), a CD-ROM, a magnetic tape, a floppy disk, and an optical data storage device.

Figure 16:
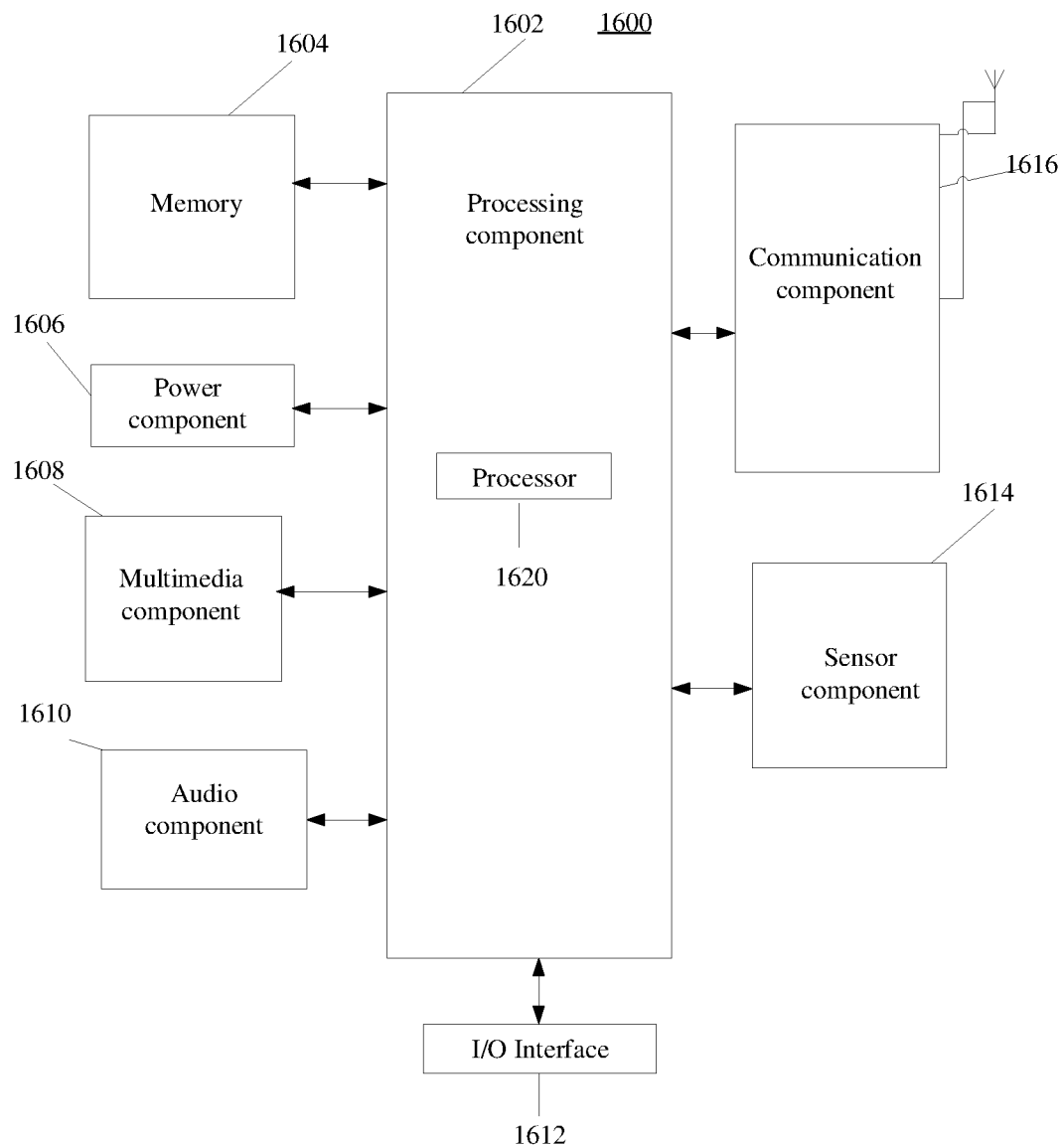
FIG. 16 is a block diagram illustrating an apparatus suitable for receiving information according to an example.

FIG. 16 is a block diagram illustrating an apparatus suitable for receiving information according to an example. For example, an apparatus 1600 may be a mobile phone, a computer, a digital broadcast terminal, a messaging device, a game console, a tablet device, a medical equipment, a fitness equipment, a personal digital assistant or other user equipment.

Referring to FIG. 16, the apparatus 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 usually controls the overall operation of the apparatus 1600, such as operations associated with display, telephone calls, data communications, camera operations, and recording operations. The processing component 1602 may include one or more processors 1620 to execute instructions to perform all or part of the steps in the methods described above. Moreover, the processing component 1602 may include one or more modules to facilitate interaction between the processing component 1602 and other components. For example, the processing component 1602 may include a multimedia module to facilitate interaction between the multimedia component 1608 and the processing component 1602.

One of the processors 1620 in the processing component 1602 may be configured to:
- if no cell reselection occurs within a first preset time period, report auxiliary information of the UE to a base station; and
- receive a paging message for the UE sent from the base station according to the auxiliary information.

The memory 1604 is configured to store various types of data to support operation at the apparatus 1600. Examples of these data include instructions for any application or method operating at the apparatus 1600, contact data, phone book data, messages, pictures, videos, and the like. The memory 1604 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a ROM, a magnetic memory, a flash memory, a disk or a compact disk.

The power component 1606 provides power to various components of the apparatus 1600. The power component 1606 may include a power management system, one or more power sources, and other components associated with power generated, managed, and distributed for the apparatus 1600.

The multimedia component 1608 includes a screen that provides an output interface between the apparatus 1600 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1608 includes a front camera and/or a rear camera. When the apparatus 1600 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1610 is configured to output and/or input audio signals. For example, the audio component 1610 includes a microphone (MIC) configured to receive an external audio signal when the apparatus 1600 is in an operation mode, such as a call mode, a recording mode, and a voice recognition mode. The received audio signal may be further stored in the memory 1604 or transmitted via the communication component 1616. In some examples, the audio component 1610 also includes a loudspeaker for outputting an audio signal.

The I/O interface 1612 provides an interface between the processing component 1602 and a peripheral interface module which may be a keyboard, a click wheel, a button, or the like. These buttons may include, but are not limited to a home button, a volume button, a start button, and a lock button.

The sensor component 1614 includes one or more sensors for providing a status assessment in various aspects to the apparatus 1600. For example, the sensor component 1614 may detect an open/closed state of the apparatus 1600, and the relative positioning of components, for example, the component is a display and a keypad of the apparatus 1600. The sensor component 1614 may also detect a change in position of the apparatus 1600 or a component of the apparatus 1600, the presence or absence of a user in contact with the apparatus 1600, the orientation or acceleration/deceleration of the apparatus 1600 and a change in temperature of the apparatus 1600. The sensor component 1614 may include a proximity sensor configured to detect the presence of nearby objects without any physical contact. The sensor component 1614 may also include a light sensor, such as a CMOS or CCD image sensor, for use in imaging applications. In some examples, the sensor component 1614 may also include an acceleration sensor, a gyro sensor, a magnetic sensor, a pressure sensor, or a temperature sensor.

The communication component 1616 is configured to facilitate wired or wireless communication between the apparatus 1600 and other devices. The apparatus 1600 may access a wireless network based on a communication standard, such as WiFi, 2G or 3G, or a combination thereof. In an example, the communication component 1616 receives broadcast signals or broadcast associated information from an external broadcast management system via a broadcast channel In an example, the communication component 1616 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1600 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 1604 including instructions. The instructions are executable by the processor 1620 of the apparatus 1600 to perform the method as described above. For example, the non-transitory computer readable storage medium may be a ROM, a RAM, a CD-ROM, a magnetic tape, a floppy disk, and an optical data storage device.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

It should be noted that, in this context, relational terms such as "first" and "second" are used merely to distinguish one entity or operation from the other entity or operation, and do not necessarily require or imply the existence of any such actual relationship or order between these entities or operations. The terms "comprising", "including" or any other variants thereof are intended to cover non-exclusive inclusion, such that a process, method, article, or device including a series of elements includes not only those elements but also other elements not specifically listed, or further includes elements inherent to such process, method, article, or device. Under the circumstance of no more limitation, an element limited by the phrase "comprising a . . . " does not exclude the presence of additional equivalent elements in the process, method, article, or device that includes the element.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A method of sending information, being applicable to a base station, and comprising:
receiving auxiliary information of user equipment (UE) reported by the UE;
determining to enter a reduced paging transmission area state according to the auxiliary information and pre-stored capability information of the UE;
reducing a paging transmission area according to the reduced paging transmission area state, and sending a wake-up signal or a wake-up channel for the UE within the reduced paging transmission area, wherein the reduced paging transmission area is a sub-area of a tracking area; and
sending a paging message for the UE within the reduced paging transmission area;
wherein the method further comprises:
before determining to enter the reduced paging transmission area state according to the auxiliary information and the pre-stored capability information of the UE, determining that the paging message for the UE does not belong to a preset type of paging message.

2. The method according to claim 1, further comprising:
setting a first paging count threshold and a second paging count threshold; and
in response to determining that a number of times sending the paging message within the reduced paging transmission area reaches the first paging count threshold and the UE has not been paged, restoring the paging transmission area to an initial paging transmission area, and sending the paging message within the initial paging transmission area.

3. The method according to claim 2, further comprising:
in response to determining that a number of times sending the paging message within the initial paging transmission area reaches the second paging count threshold and the UE has not been paged, aborting sending the paging message.

4. The method according to claim 2, further comprising:
not re-entering the reduced paging transmission area state for a second preset time period from restoring the paging transmission area to the initial paging transmission area.

5. The method according to claim 1, further comprising:
receiving and storing updated capability information reported by the UE;
sending the wake-up signal or the wake-up channel for the UE within an initial paging transmission area according to the updated capability information of the UE; and
sending the paging message for the UE within the initial paging transmission area.

6. The method according to claim 1, wherein receiving the auxiliary information of the UE reported by the UE comprises:
receiving the auxiliary information of the UE reported by the UE through a preset request.

7. A method of receiving information, being applicable to user equipment (UE), and comprising:

in response to determining that no cell reselection occurs within a first preset time period, reporting auxiliary information of the UE to a base station;

receiving a wake-up signal or a wake-up channel for the UE from the base station within a reduced paging transmission area, wherein the wake-up signal or the wake-up channel is sent after the base station determines that a paging message for the UE does not belong to a preset type of paging message, and determines to enter a reduced paging transmission area state according to the auxiliary information and pre-stored capability information of the UE, and wherein the reduced paging transmission area is a sub-area of a tracking area; and receiving the paging message for the UE from the base station in the reduced paging transmission area.

8. The method according to claim 7, further comprising:
reporting capability information of the UE to the base station.

9. The method according to claim 8, further comprising:
after reporting the capability information of the UE to the base station, reporting updated capability information of the UE to the base station.

10. The method according to claim 8, wherein reporting the capability information of the UE to the base station comprises one of:
sending a radio resource control (RRC) connection establishment request to the base station, wherein the RRC connection establishment request carries the capability information; or
receiving a capability query request from the base station, and sending the capability information of the UE to the base station according to the capability query request.

11. The method according to claim 7, wherein reporting the auxiliary information of the UE to the base station comprises:
reporting the auxiliary information of the UE to the base station through a preset request.

12. User equipment, comprising:
a processor, and
a memory for storing instructions executable by the processor,
wherein the processor is configured to perform the method according to claim 7.

13. A base station, comprising:
a processor, and
a memory for storing instructions executable by the processor,
wherein the processor is configured to:
receive auxiliary information of user equipment (UE) reported by the UE;
determine to enter a reduced paging transmission area state according to the auxiliary information and pre-stored capability information of the UE;

reduce a paging transmission area according to the reduced paging transmission area state, and send a wake-up signal or a wake-up channel for the UE within the reduced paging transmission area, wherein the reduced paging transmission area is a sub-area of a tracking area; and
send a paging message for the UE within the reduced paging transmission area;
wherein the processor is further configured to:
before determining to enter the reduced paging transmission area state according to the auxiliary information and the pre-stored capability information of the UE, determine that the paging message for the UE does not belong to a preset type of paging message.

14. The base station according to claim 13, wherein the processor is further configured to:
set a first paging count threshold and a second paging count threshold; and
in response to determining that a number of times sending the paging message within the reduced paging transmission area reaches the first paging count threshold and the UE has not been paged, restore the paging transmission area to an initial paging transmission area, and send the paging message within the initial paging transmission area.

15. The base station according to claim 14, wherein the processor is further configured to:
in response to determining that a number of times sending the paging message within the initial paging transmission area reaches the second paging count threshold and the UE has not been paged, abort sending the paging message.

16. The base station according to claim 14, wherein the processor is further configured to:
not re-enter the reduced paging transmission area state for a second preset time period from restoring the paging transmission area to the initial paging transmission area.

17. The base station according to claim 13, wherein the processor is further configured to:
receive and store updated capability information reported by the UE;
send the wake-up signal or the wake-up channel for the UE within an initial paging transmission area according to the updated capability information of the UE; and
send the paging message for the UE within the initial paging transmission area.

18. The base station according to claim 13, wherein the processor is further configured to:
receive the auxiliary information of the UE reported by the UE through a preset request.

* * * * *